US012224139B2

(12) United States Patent
Namikawa

(10) Patent No.: US 12,224,139 B2
(45) Date of Patent: Feb. 11, 2025

(54) BREAKER AND SAFETY CIRCUIT EQUIPPED WITH THE SAME, AND SECONDARY BATTERY PACK

(71) Applicant: Bourns KK, Suita (JP)

(72) Inventor: Masashi Namikawa, Suita (JP)

(73) Assignee: Bourns KK, Suita (JP)

( * ) Notice: Subject to any disclaimer, the term of this patent is extended or adjusted under 35 U.S.C. 154(b) by 92 days.

(21) Appl. No.: 18/248,753

(22) PCT Filed: Oct. 18, 2021

(86) PCT No.: PCT/JP2021/038358
§ 371 (c)(1),
(2) Date: Apr. 12, 2023

(87) PCT Pub. No.: WO2022/085611
PCT Pub. Date: Apr. 28, 2022

(65) Prior Publication Data
US 2023/0402242 A1     Dec. 14, 2023

(30) Foreign Application Priority Data

Oct. 19, 2020  (JP) .................................. 2020-175316

(51) Int. Cl.
*H01H 37/54*  (2006.01)

(52) U.S. Cl.
CPC ............................. *H01H 37/5427* (2013.01)

(58) Field of Classification Search
CPC ........ H01H 37/5427; H01M 2200/101; H01M 50/581; Y02E 60/10
See application file for complete search history.

(56) References Cited

U.S. PATENT DOCUMENTS

2016/0035521 A1\*  2/2016  Namikawa ......... H01H 37/5427
                                                337/380
2016/0035522 A1\*  2/2016  Namikawa ............. H01H 37/52
                                                337/362

FOREIGN PATENT DOCUMENTS

JP        2014235913 A  \* 12/2014
JP         2016-31917 A    3/2016
(Continued)

OTHER PUBLICATIONS

Namikawa Katsufumi, "Breaker and Safety Circuit Provided with the Same, and Secondary Battery Circuit", Dec. 15, 2014, Komatsulite MFG Co. Ltd., Entire Document (Translation of JP 2014235913). (Year: 2014).\*

(Continued)

*Primary Examiner* — Stephen S Sul
(74) *Attorney, Agent, or Firm* — Muncy, Geissler, Olds & Lowe, P.C.

(57) ABSTRACT

A breaker comprises: a first terminal piece on which a fixed contact is formed; a movable piece having a movable contact, for pressing the movable contact against the fixed contact so as to contact therewith; a thermally-actuated element deforming with a change in temperature and moving the movable piece so that the movable contact is separated from the fixed contact, and a second terminal piece electrically connected to the movable piece. The movable piece is provided, within a contact portion contacting with the second terminal piece, with a protrusion projecting toward the thermally-actuated element.

8 Claims, 6 Drawing Sheets

(56) References Cited

FOREIGN PATENT DOCUMENTS

WO        2015156136 A1    10/2015
WO    WO-2019017195 A1 *   1/2019  ............ H01H 37/04

OTHER PUBLICATIONS

Namikawa Masahi, "Breaker and Safety Circuit Comprising Said Breaker", Apr. 11, 2019, Bourns KK, Entire Document (Translation of WO 2019069790). (Year: 2019).*

* cited by examiner

BREAKER AND SAFETY CIRCUIT EQUIPPED WITH THE SAME, AND SECONDARY BATTERY PACK

CROSS-REFERENCE TO RELATED APPLICATION(S)

This application is a National Stage Patent Application of PCT International Patent Application No. PCT/JP2021/038358 filed on Oct. 18, 2021 under 35 U.S.C § 371, which claims priority on the basis of Japanese Patent Application No. 2020-175316, filed on Oct. 19, 2020 in Japan, which are all hereby incorporated by reference in their entirety The present invention relates to a minisize breaker to be incorporated in an electric device, and the like.

BACKGROUND ART

Conventionally, breakers have been used as protective devices (safety circuits) for secondary batteries, motors, etc. of various electric devices (see, for example, Patent Document 1).

PRIOR ART DOCUMENTS

Patent Document

Patent document 1: Japanese Patent Application Publication No. 2016-31917

SUMMARY OF THE INVENTION

Problems to be Solved by the Invention

In recent years, as the high output of electrical equipment has progressed, there has been a demand for breakers with lower conduction resistance (i.e. higher current capacity).

Such a breaker can be achieved, for example, by using a movable piece with high elasticity.

However, when such a movable piece is employed, it is difficult to push up the movable piece with a thermally-actuated element having a limited size. Therefore, it has been difficult to sufficiently reduce the conduction resistance while maintaining the size of the breaker and the safety of the device.

The present invention has been devised in view of the actual situation as described above, and has a primary objective which is to provide a breaker with a low conduction resistance.

Means for Solving the Problems

The present invention is a breaker comprising:
a first terminal piece on which a fixed contact is formed;
a movable piece having a movable contact, for pressing the movable contact against the fixed contact so as to contact therewith;
a thermally-actuated element deforming with a change in temperature and moving the movable piece so that the movable contact is separated from the fixed contact; and
a second terminal piece electrically connected to the movable piece, wherein the movable piece is provided, within a contact portion contacting with the second terminal piece, with a protrusion projecting toward the thermally-actuated element.

In the breaker according to the present invention, it is desirable that the movable piece is disposed on the thermally-actuated element side of the second terminal piece.

In the breaker according to the present invention, it is desirable to have a first case in which a portion of the first terminal piece is embedded and the thermally-actuated element is housed, and a second case in which a portion of the second terminal piece is embedded and the movable pieces is housed, wherein the first case and the second case are fixed together.

In the breaker according to the present invention, it is desirable that the movable piece is welded to the second terminal piece in the contact portion, and the welded portion between the movable piece and the second terminal piece overlaps with the protrusion in a longitudinal direction of the movable piece.

In the breaker according to the present invention, it is desirable that the center of the welded portion is shifted from the center of the protrusion toward the movable contact.

In the breaker according to the present invention, it is desirable that the movable piece has a bent portion which is bent so that the movable contact approaches the fixed contact.

In the breaker according to the present invention, it is desirable that an edge of the thermally-actuated element overlaps with the contact portion when viewed in the thickness direction of the movable piece.

The present invention is a safety circuit for an electric device, comprising the breaker.

The present invention is a secondary battery pack comprising the breaker.

Effect of the Invention

According to the breaker of the present invention, since the movable piece is provided, within the contact portion contacting with the second terminal piece, with the protrusion projecting toward the thermally-actuated element, the edge of the thermally-actuated element can be extended to the contact portion. Therefore, it becomes possible to employ the thermally-actuated element having a large size while maintaining the size of the breaker, and it becomes possible to easily secure a force for pushing up the movable piece when thermally deformed.

As a result, the contact resistance between the fixed contact and the movable contact is reduced by employing the movable piece having a large elastic force, and it becomes possible to easily increase the capacity of the breaker.

In addition, since the movable piece itself has a low conduction resistance, it contributes to increasing the capacity of the breaker.

MODE FOR CARRYING OUT THE INVENTION

A breaker according to an embodiment of the present invention will be described with reference to the drawings.

Figure 1:
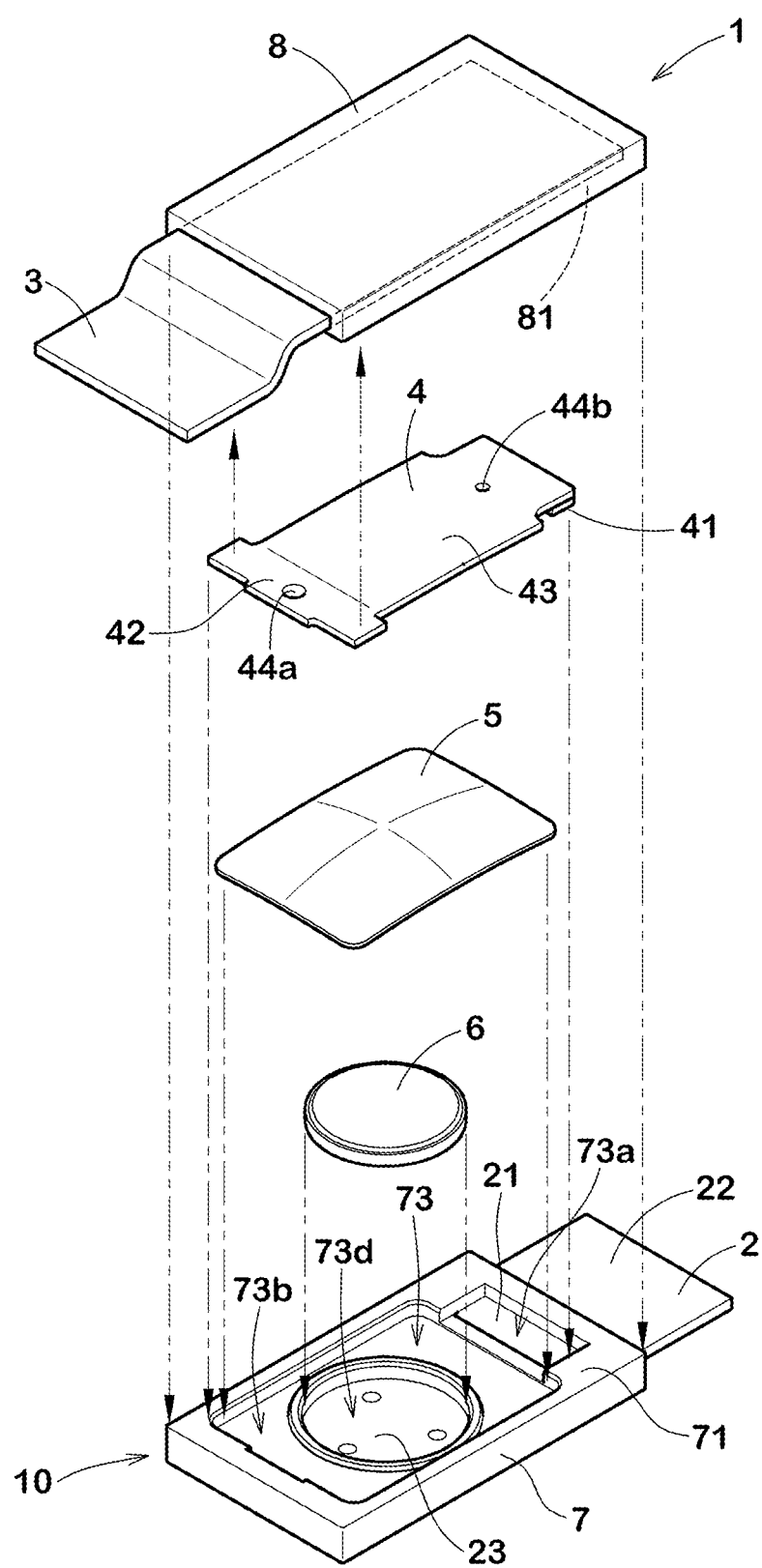
FIG. 1 is a perspective view showing a schematic configuration of a breaker before assembly, according to an embodiment of the present invention.
Figure 2:
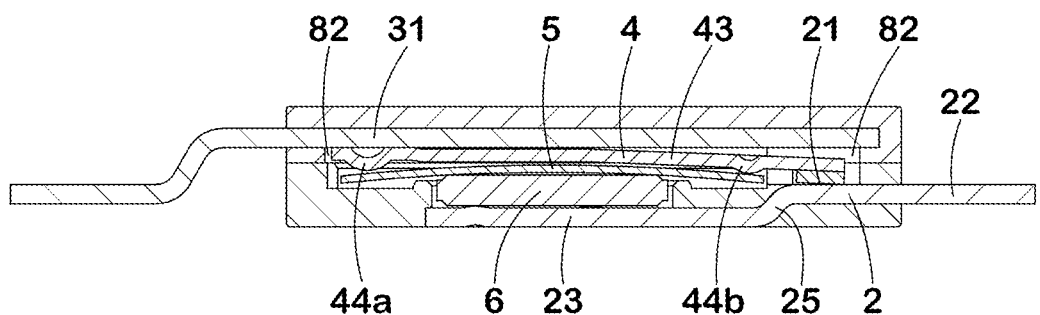
FIG. 2 is a cross-sectional view showing the breaker in a normal charging or discharging state.
Figure 3:
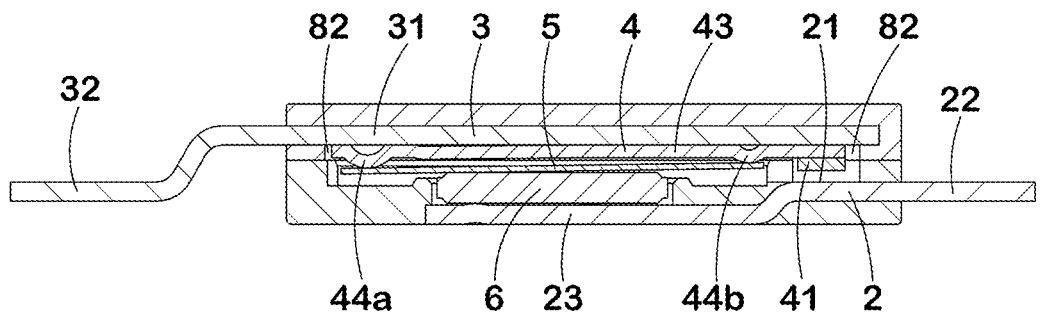
FIG. 3 is a cross-sectional view showing the breaker in an overcharged state or an abnormal state.

FIG. 1 to FIG. 3 show the construction of the breaker.

As shown in FIG. 1, the breaker 1 is composed of a first terminal piece 2 on which a fixed contact 21 is formed, a movable piece 4 having a movable contact 41, a second terminal piece 3 electrically connected to the movable piece 4, a thermally-actuated element 5 which deforms with a change in temperature, and a PTC (Positive Temperature Coefficient) thermistor 6, and the like.

The breaker 1 constitutes a main part of a safety circuit of an electric device by connecting the first terminal piece 2 and the second terminal piece 3 to the external circuit.

The first terminal piece 2, the second terminal piece 3, the movable piece 4, the thermally-actuated element 5, and the PTC thermistor 6 are housed in a case 10.

The case 10 is composed of a case main body (first case) 7, a lid member (second case) 8 attached to the upper surface of the case main body 7, and the like.

The first terminal piece 2 is formed into a plate shape by pressing a metal plate which is, for example, mainly composed of copper or the like (other metal plates such as copper-titanium alloy, nickel silver, and brass), and the first terminal piece is embedded in the case main body 7 by insert molding.

The fixed contact 21 is formed by cladding, plating, coating or the like of a highly conductive material, e.g. silver, nickel, nickel-silver alloy, copper-silver alloy, gold-silver alloy, and the like.

The fixed contact 21 is formed on the first terminal piece 2 at a position facing the movable contact 41, and the fixed contact is exposed to an accommodating recess 73 of the case main body 7 through a part of an opening 73a formed inside the case main body 7.

Across the fixed contact 21, a first terminal 22 which is electrically connected to an external circuit, is formed on one end side of the first terminal piece 2, and a support portion 23 which is for supporting the PTC thermistor 6, is formed on the other end side of the first terminal piece 2.

The first terminal 22 protrudes from the side wall of the case main body 7, and is connected to a land portion of a circuit board of the external circuit by a method such as soldering.

In the present application, unless otherwise specified, of the first terminal piece 2, the surface on the side where the fixed contact 21 is formed (that is, the upper surface in FIG. 1) is referred to as the first surface, and the bottom surface on the opposite side is referred to as the second surface.

The same applies to other parts such as the second terminal piece 3, the movable piece 4, the thermally-actuated element 5, the case 10, and the like.

The support portion 23 is exposed to the accommodating recess 73 of the case main body 7 through a part of the opening 73d formed inside the case main body 7, and is electrically connected to the PTC thermistor 6.

As shown in FIG. 2, the first terminal piece 2 has a stepped portion 25 which is bent stepwise (crank-shaped in the side view).

The stepped portion 25 connects between the fixed contact 21 and the support portion 23, and arranges the fixed contact 21 and the support portion 23 at different heights. This allows the PTC thermistor 6 to be stored compactly.

Similarly to the first terminal piece 2, the second terminal piece 3 is formed into a plate shape by pressing a metal plate mainly composed of copper or the like, and is embedded in the lid member 8 by insert molding.

The second terminal piece 3 has a joint portion 31 to which the movable piece 4 is connected, and a second terminal 32 electrically connected to an external circuit.

The joint portion 31 is formed on the side of one end of the second terminal piece 3, and the second terminal 32 is formed on the side of the other end of the second terminal piece 3.

The joint portion 31 is exposed to an accommodating recess 82 of the lid member 8, and electrically connected to the movable piece 4.

The second terminal 32 protrudes from the side wall of the lid member 8, and a second connection surface 32a is connected to a land portion of a circuit board by a method such as soldering.

The movable piece 4 is formed into a plate shape by pressing a metal material mainly composed of copper or the like.

The movable piece 4 is formed in an arm shape symmetrical with respect to the center line in the longitudinal direction.

The movable piece 4 is provided, in one end portion thereof, with a movable contact 41.

The movable contact 41 is made of the same material as the fixed contact 21 and is formed on the second surface of the movable piece 4 and joined to the fore-end portion of the movable piece 4 through a technique such as welding, cladding, crimping and the like.

At the other end of the movable piece 4, a joint portion 42 which is joined to the joint portion 31 of the second terminal piece 3 is formed.

The second surface of the joint portion 31 of the second terminal piece 3 and the first surface of the joint portion 42 of the movable piece 4 are fixed by laser welding, for example. Thereby, the second terminal piece 3 and the movable piece 4 are electrically connected.

Laser welding is a welding method in which the workpieces (correspond to the second terminal piece 3 and the movable piece 4 in this embodiment) are irradiated with a laser beam, and the workpieces are locally melted and solidified to join the workpieces together.

On the surface of the workpiece irradiated with the laser beam, there is formed a laser welding mark having a shape different from the welding marks formed by other welding methods (for example, resistance welding using Joule heat).

The movable piece 4 has an elastic portion 43 between the movable contact 41 and the joint portion 42.

The elastic portion 43 extends from the joint portion 42 toward the movable contact 41. Thereby, the joint portion 42 is provided on the opposite side of the elastic portion 43 to the movable contact 41.

The movable piece 4 is fixed by being fixed to the joint portion 31 of the second terminal piece 3 at the joint portion 42, and when the elastic portion 43 is elastically deformed, the movable contact 41 formed at the tip thereof is pressed toward the fixed contact 21 and brought into contact therewith, and it become possible to flow electricity between the first terminal piece 2 and the movable piece 4.

Since the movable piece 4 and the second terminal piece 3 are electrically connected at the joint portion 31 and the joint portion 42, it is possible to flow electricity between the first terminal piece 2 and the second terminal piece 3.

The movable piece 4 is, in the elastic portion 43, curved or bent by press working. The degree of curving or bending is not particularly limited as long as the thermally-actuated element 5 can be accommodated, and may be appropriately set in consideration of the elastic force at the operating temperature and reset temperature, the force pressing the contact, and the like. The elastic portion 43 is provided, on the second surface thereof, with a pair of protrusions (contact portions) 44a and 44b facing the thermally-actuated element 5.

The protrusions 44a and 44b are in contact with the thermally-actuated element 5, and the deformation of the thermally-actuated element 5 is transmitted to the elastic portion 43 via the protrusions 44a and 44b (see FIGS. 1 and 3).

The thermally-actuated element 5 shifts the state of the movable piece 4 from the conductive state in which the movable contact 41 is in contact with the fixed contact 21 to the disconnected state in which the movable contact 41 is separated from the fixed contact 21.

The thermally-actuated element 5 has an arcuately curved initial shape and is formed by laminating thin plate materials having different coefficients of thermal expansion.

When the operating temperature is reached by overheating, the curved shape of the thermally-actuated element 5 warps reversely with a snap motion, and recovers when cooled below the reset temperature.

The initial shape of the thermally-actuated element 5 can be formed by pressing.

The material and shape of the thermally-actuated element 5 are not particularly limited as long as the elastic portion 43 of the movable piece 4 is pushed up by the reverse warping motion of the thermally-actuated element 5 at a desired temperature and is returned to its original state by the elastic force of the elastic portion 43. However, a rectangular shape is desirable from the viewpoint of productivity and efficiency of the reverse warping motion, and a rectangular shape close to a square is desirable in order to efficiently push up the elastic portion 43 while being compact.

As to the materials of the thermally-actuated element 5, a laminate of two kinds of materials having different coefficients of thermal expansion, which are made of various alloys, for example, copper-nickel-manganese alloy or nickel-chromium-iron alloy on the high expansion side, and iron-nickel alloy, nickel silver, brass, and stainless steel on the low expansion side, is used in combination according to required conditions.

When the movable piece 4 is in the disconnected state, the PTC thermistor 6 brings the first terminal piece 2, the second terminal piece 3 and the movable piece 4 into a conduction state.

The PTC thermistor 6 is disposed between the support portion 23 of the first terminal piece 2 and the thermally-actuated element 5.

When the conduction between the first terminal piece 2 and the movable piece 4 is interrupted by the reverse warping motion of the thermally-actuated element 5, the current flowing through the PTC thermistor 6 increases.

If the PTC thermistor 6 is a positive characteristic thermistor whose resistance value increases as the temperature rises to limit the current, the type can be selected according to the needs such as the operating current, operating voltage, operating temperature, reset temperature and the like. And, the materials and shapes are not particularly limited as long as they do not impair these properties.

In this embodiment, a ceramic sintered body comprising barium titanate, strontium titanate, or calcium titanate is used.

In addition to the ceramic sintered body, a so-called polymer PTC in which conductive particles such as carbon are contained in a polymer may be used.

The case main body 7 and the lid member 8 constituting the case 10 are molded from a thermoplastic resin such as flame-retardant polyamide, polyphenylene sulfide (PPS) with excellent heat resistance, liquid crystal polymer (LCP), and polybutylene terephthalate (PBT).

As long as characteristics as well or better than those of the resins described above can be obtained, insulating materials other than resins may be used.

The case main body 7 is provided with the accommodating recess 73 which is an internal space for housing the movable piece 4, the thermally-actuated element 5, the PTC thermistor 6, and the like.

The accommodating recess 73 has openings 73a and 73b for housing the movable piece 4, an opening 73c for housing the movable piece 4 and the thermally-actuated element 5, an opening 73d for housing the PTC thermistor 6, and the like.

The edge of the thermally-actuated element 5 incorporated in the case main body 7 is appropriately abutted by a frame formed in the accommodating recess 73, and guided when the thermally-actuated element 5 warps reversely.

The second terminal piece 3 is embedded in the cover member 8 by insert molding.

As shown in FIGS. 2 and 3, the second terminal piece 3 appropriately abuts on the first surface of the movable piece 4 to limit the movement of the movable piece 4, and contributes to the miniaturization of the breaker 1 while increasing the rigidity and strength of the lid member 8 and the case 10 as a housing.

The lid member 8 is provided with the accommodating recess 82 which is an internal space for housing the movable piece 4.

The second terminal piece 3 is exposed to the accommodating recess 82.

As shown in FIG. 1, the lid member 8 is attached to the case main body 7 so as to close the openings 73a, 73b, 73c, etc. of the case main body 7 in which the fixed contact 21, the movable piece 4, the thermally-actuated element 5, the PTC thermistor 6 and the like are housed.

The case main body 7 and the lid member 8 are joined by ultrasonic welding, for example. At this time, the case main body 7 and the lid member 8 are continuously joined over the entire circumferences of their outer edge portions, so the airtightness of the case 10 is improved. Thereby, the internal space of the case 10 provided by the accommodating recess 73 and the accommodating recess 82 is sealed, and the parts such as the movable piece 4, the thermally-actuated element 5, and the PTC thermistor 6 can be shielded from the atmosphere outside the case 10 and protected.

FIG. 2 shows the operation of the breaker 1 in a normal charging or discharging state.

In the normal charging or discharging state, the thermally-actuated element 5 maintains its initial shape (before reverse warping).

By the elastic deformation of the elastic portion 43, the movable contact 41 is pressed toward the fixed contact 21 and makes contact therewith.

Thereby, the first terminal piece 2 and the second terminal piece 3 of the breaker 1 are electrically connected through the elastic portion 43 of the movable piece 4 and the like.

The elastic portion 43 of the movable piece 4 and the thermally-actuated element 5 may contact each other, and the movable piece 4, the thermally-actuated element 5, the PTC thermistor 6, and the first terminal piece 2 may be electrically connected as a circuit.

FIG. 3 shows the operation of the breaker 1 in an overcharge condition or an abnormal condition.

When the temperature rises due to overcharging or an abnormality, the thermally-actuated element 5 which reaches the operating temperature, warps reversely, and the elastic portion 43 of the movable piece 4 is pushed up, and the fixed contact 21 and the movable contact 41 are separated.

The operating temperature of the thermally-actuated element 5 when the thermally-actuated element 5 deforms in the inside of the breaker 1 and pushes up the movable piece 4 is, for example, 70 deg. C. to 90 deg. C.

At this time, the current flowing between the fixed contact 21 and the movable contact 41 is cut off, and a small leakage current flows through the thermally-actuated element 5 and the PTC thermistor 6.

As long as such leakage current flows, the PTC thermistor 6 continues to generate heat to keep the thermally-actuated element 5 in the reversely warping state, and the resistance value increases greatly.

Therefore, no current flows through the path between the fixed contact 21 and the movable contact 41, and there is only the slight leakage current mentioned above (constituting a self-holding circuit).

This leakage current can be used for other functions of a safety device.

Figure 4:
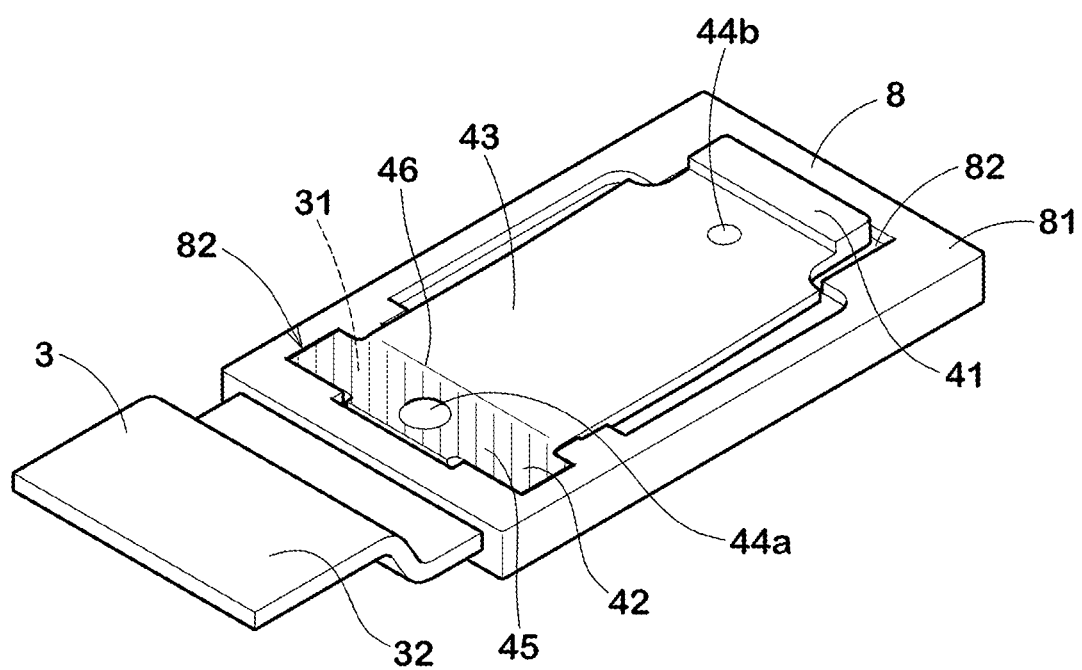
FIG. 4 is a perspective view showing a lid member into which the second terminal piece and the movable piece are integrated.

FIG. 4 is a perspective view showing the lid member 8 into which the second terminal piece 3 and the movable piece 4 are integrated, from the second surface side.

The lid member 8 has a fixing surface 81 fixed to the case main body 7.

The fixing surface 81 is fixed to a fixing surface 71 of the case main body 7 by ultrasonic welding, for example.

The accommodating recess 82 is formed inside the lid member 8 so as to be recessed from the fixing surface 81.

The second terminal piece 3 insert-molded in the lid member 8 is exposed to the space of the accommodating recess 82.

The joint portion 42 of the movable piece 4 is joined to the joint portion 31 of the second terminal piece 3 within the accommodating recess 82.

The joint portion 42 of the movable piece 4 constitutes a contact portion 45 contacting with the second terminal piece 3.

In FIG. 4, the contact portion 45 is a hatched area.

The movable piece 4 may not be fixed to the second terminal piece 3 if electrical contact with the second terminal piece 3 is ensured in the contact portion 45.

The movable contact 41 and a part (tip section) of the elastic portion of the movable piece 4 protrude from the fixing surface 81 of the lid member 8 toward the case main body 7.

Thus, when the lid member 8 is fixed to the case main body 7, the elastic portion 43 generates an elastic force to press the movable contact 41 toward the fixed contact 21.

Figure 5:
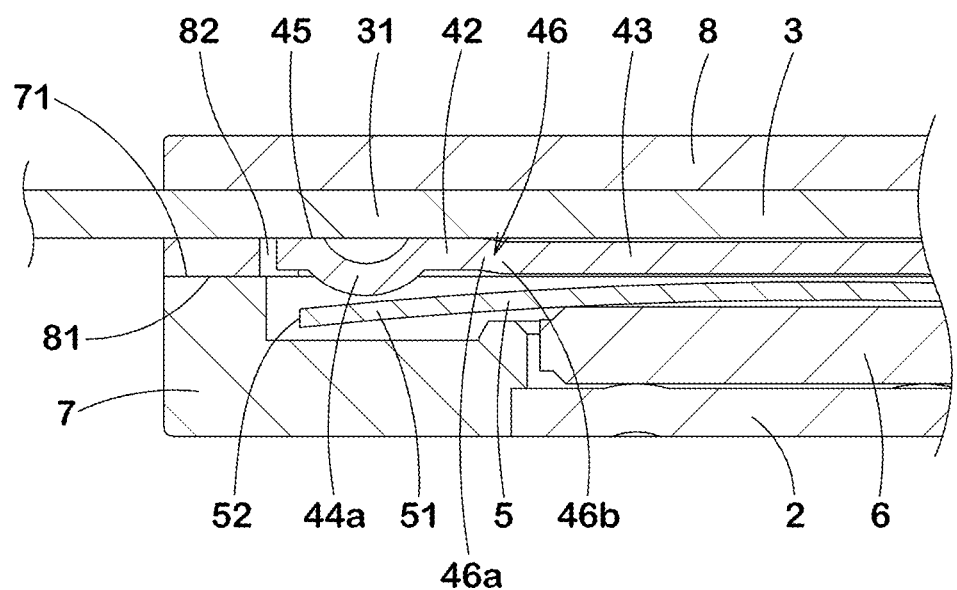
FIG. 5 is an enlarged cross-sectional view showing the surrounding area of a joint portion of the second terminal piece and a joint portion of the movable piece.

FIG. 5 enlargedly shows the surrounding area of the joint portion 31 of the second terminal piece 3 and the joint portion 42 of the movable piece 4.

The second surface of the elastic portion 43 is provided with the protrusion 44a so as to face the thermally-actuated element 5.

The protrusion 44a protrudes toward the thermally-actuated element 5.

A plurality of protrusions 44a may be provided.

The protrusion 44a faces an edge portion 51 of the thermally-actuated element 5 on the side of the second terminal 32 and is formed so as to be in contact with the edge portion 51.

Further, in the present breaker 1, the protrusion 44a is provided within the contact portion 45.

The edge portion 51 of the thermally-actuated element 5 is, for example, a region within 15% of the length of the thermally-actuated element 5 from the edge 52 toward the inside.

According to the breaker 1 of the present embodiment, since the movable piece 4 has the protrusion 44a protruding toward the thermally-actuated element 5 within the contact portion 45 and coming into contact with the thermally-actuated element 5, the edge portion 51 of the thermally-actuated element 5 can be extended up to the contact portion 45.

Therefore, while maintaining the size of the breaker 1, it becomes possible to employ a large-sized thermally-actuated element 5, and it becomes possible to easily ensure a force for pushing up the movable piece 4 when thermally deformed.

Thereby, the capacity of the breaker 1 can be easily increased by reducing the contact resistance between the fixed contact 21 and the movable contact 41 by employing the movable piece 4 having a large elastic force.

In addition, such movable piece 4 contributes to increasing the capacity of the breaker 1 because it has a low conduction resistance itself.

As shown in FIG. 4, the elastic portion 43 of the present embodiment is provided with the protrusion 44a and the protrusion 44b.

However, the protrusion 44b disposed adjacently to the movable contact 41 may be omitted.

It is preferable that the movable piece 4 is disposed on the thermally-actuated element 5 side of the second terminal piece 3.

Thereby, the thickness of the breaker 1 can be reduced, and it becomes possible to easily attempt the height reduction.

It is preferable that the movable piece 4 is welded to the second terminal piece 3 at the contact portion 45.

Thereby, the movable piece 4 is firmly fixed to the second terminal piece 3, and the contact resistance between the movable piece 4 and the second terminal piece 3 is reduced.

Further, since the posture of the movable piece 4 becomes stabilized, the contact resistance between the movable contact 41 and the fixed contact is reduced.

Figure 6:
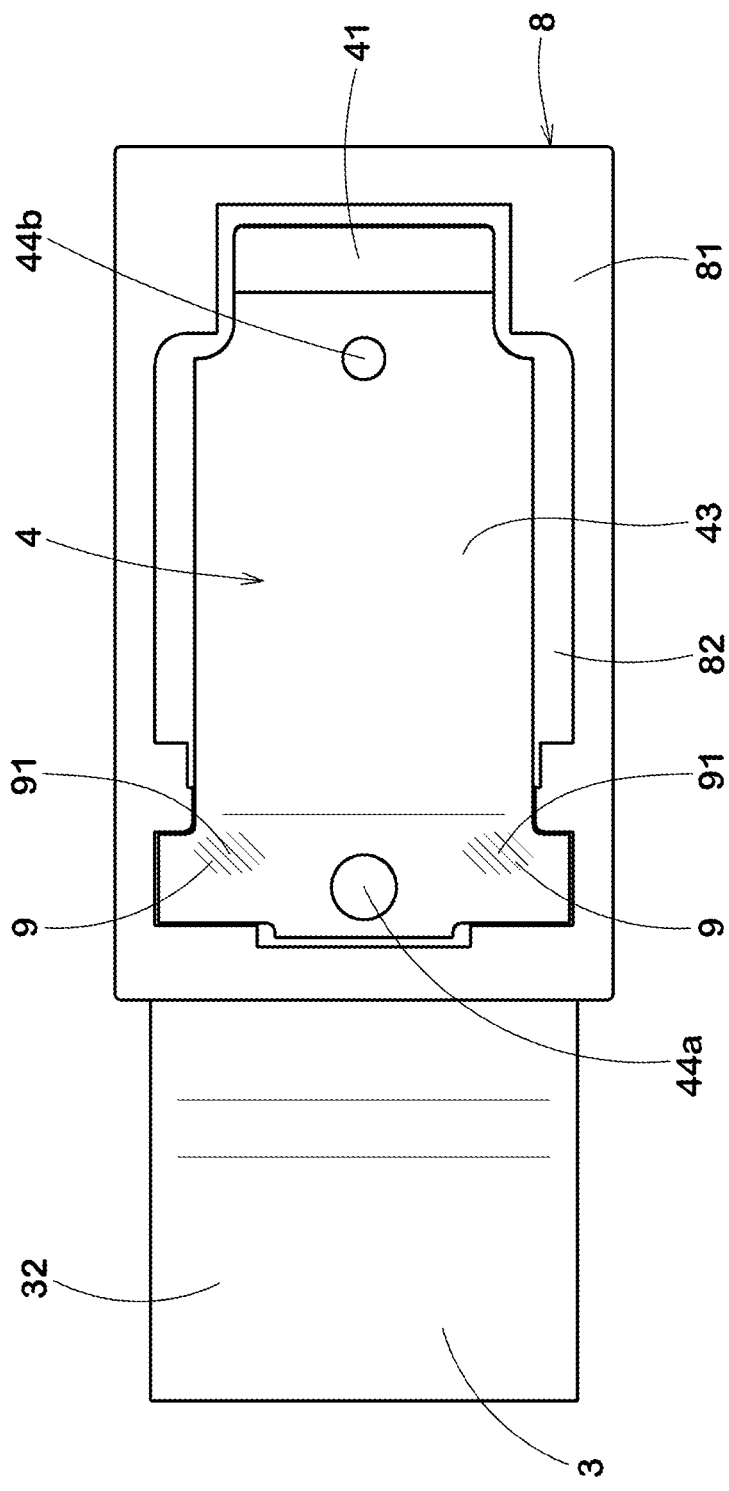
FIG. 6 is a plan view showing the lid member into which the second terminal piece and the movable piece are integrated.

FIG. 6 is a plan view showing the lid member 8 into which the second terminal piece 3 and the movable piece 4 are integrated, from the second surface side. In FIG. 6, the welded portion 9 is a hatched area.

As described above, the welded portion 9 between the movable piece 4 and the second terminal piece 3 is disposed in the contact portion 45.

It is desirable that, in the longitudinal direction of the movable piece 4, the welded portion 9 overlaps with at least a part of the protrusion 44a.

Thereby, it becomes possible to easily attempt the miniaturization of the breaker 1.

It is desirable that the center 91 of the welded portion 9 is displaced from the center (top) of the protrusion 44a toward the movable contact 41.

According to such configuration, while maintaining the size of the case 10, the size of the thermally-actuated element 5 can be easily increased by disposing the protrusion 44a and the edge portion 51 of the thermally-actuated element 5 on the side of the second terminal 32, and it becomes possible to easily secure the force for pushing up the movable piece 4 when thermally deformed.

It is desirable that, as shown in FIG. 5, the movable piece 4 has a bent portion 46 which is bent so that the movable contact 41 approaches the fixed contact 21.

In this embodiment, the bent portion 46 is disposed at the boundary between the joint portion 42 and the elastic portion 43.

By forming the bent portion 46 in the movable piece 4, the elastic force generated by the elastic portion 43 is increased, and the contact resistance between the movable contact 41 and the fixed contact 21 is further reduced.

The bent portion 46 of the present embodiment comprises a first bent portion 46a which is convex toward the first surface of the movable piece 4, and a second bent portion 46b which is convex toward the second surface of the movable piece 4.

The first bent portion 46a is disposed on the second terminal 32 side of the second bent portion 46b.

According to the bent portion 46 including the first bent portion 46a and the second bent portion 46b, while reducing the contact resistance between the movable contact 41 and the fixed contact 21, a space for allowing deformation of the elastic portion 43 is formed between the second terminal piece 3 and the elastic portion 43, and a gap is easily secured between the movable contact 41 and the fixed contact 21 in the disconnected state shown in FIG. 3.

It is desirable that, when viewed in the thickness direction of the movable piece 4, the edge 52 of the thermally-actuated element 5 overlaps with the contact portion 45.

According to such configuration, it becomes possible to easily increase the size of the thermally-actuated element 5 while maintaining the size of the case 10, and to easily secure the force for pushing up the movable piece 4 when thermally deformed.

While detailed description has been made of the breaker 1 and the like of the present invention, the present invention can be embodied in various forms without being limited to the above-described specific embodiment.

That is, it is sufficient that the breaker 1 has at least
a first terminal piece 2 on which a fixed contact 21 is formed,
a movable piece 4 having a movable contact 41, for pressing the movable contact 41 against the fixed contact 21 so as to contact therewith,
a thermally-actuated element 5 deforming with a change in temperature and moving the movable piece 4 so that the movable contact 41 is separated from the fixed contact 21, and
a second terminal piece 3 electrically connected to the movable piece 4, wherein the movable piece 4 is provided, within a contact portion 45 contacting with the second terminal piece 3, with a protrusion 44a projecting toward the thermally-actuated element 5.

This embodiment has a self-holding circuit by the PTC thermistor 6. But, it is possible to adopt an embodiment in which such configuration is omitted. In this case, it becomes possible to easily increase the size of the thermally-actuated element 5, while reducing the size of the case 10, and easily secure the force to push up the movable piece 4 when thermally deformed.

Further, the breaker 1 or the like of the present invention can be widely applied to secondary battery packs, safety circuits for electric devices, and the like.

Figure 7:
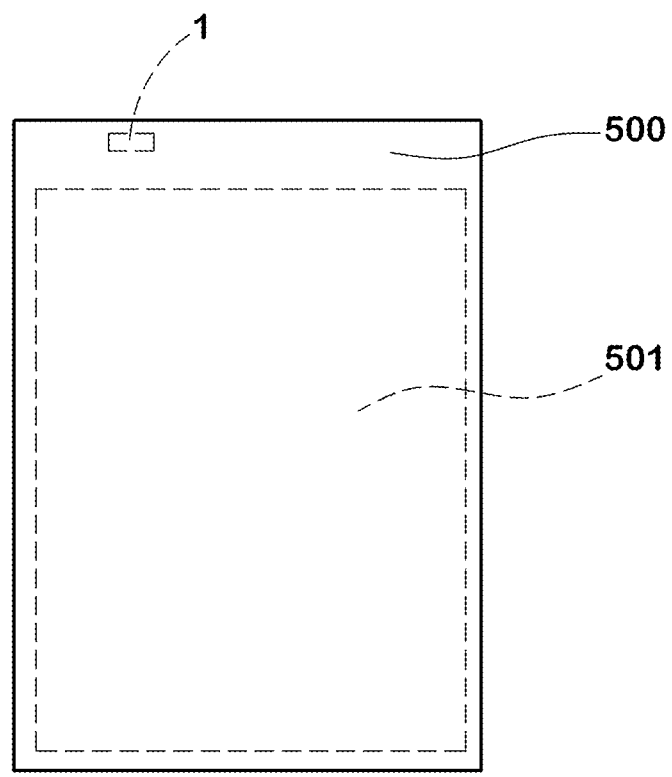
FIG. 7 is a plan view showing the configuration of a secondary battery pack equipped with the breaker of the present invention.

FIG. 7 shows a secondary battery pack 500.

The secondary battery pack 500 comprises a secondary battery 501, the breaker 1 provided in an output terminal circuit of the secondary battery 501, and the like.

Figure 8:
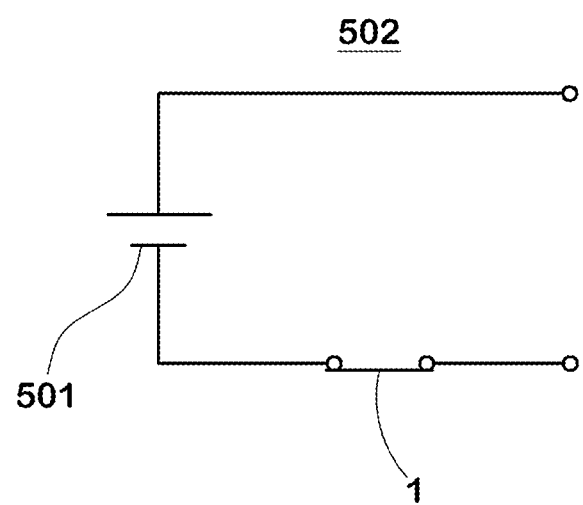
FIG. 8 is a circuit diagram of a safety circuit provided with the breaker of the present invention.

FIG. 8 shows a safety circuit 502 for electric devices.

The safety circuit 502 comprises the breaker 1 and the like in series in the output circuit of the secondary battery 501.

It is possible to configure a part of the safety circuit 502 by a cable provided with a connector having the breaker 1 or the like.

DESCRIPTION OF THE SIGNS

1 breaker
2 first terminal piece
3 second terminal piece
4 movable piece
5 thermally-actuated element
9 welded portion
21 fixed contact
22 first terminal
32 second terminal
41 movable contact
44a protrusion
44b protrusion
45 contact portion
46 bent portion
52 edge
91 center
500 secondary battery pack
501 secondary battery
502 safety circuit

The invention claimed is:
1. A breaker comprising:
a first terminal piece on which a fixed contact is formed;
a movable piece having a movable contact, for pressing the movable contact against the fixed contact so as to contact therewith;
a thermally-actuated element deforming with a change in temperature and moving the movable piece so that the movable contact is separated from the fixed contact; and
a second terminal piece electrically connected to the movable piece, wherein
the movable piece is provided, in a contact portion contacting with the second terminal piece, with a protrusion projecting toward the thermally-actuated element,
the movable piece is welded to the second terminal piece in the contact portion, and
a welded portion between the movable piece and the second terminal piece overlaps with the protrusion in a longitudinal direction of the movable piece.
2. The breaker as set forth in claim 1, wherein the movable piece is disposed on a thermally-actuated element side of the second terminal piece.
3. The breaker as set forth in claim 1, which comprises a first case in which a part of the first terminal piece is embedded and in which the thermally-actuated element is accommodated, and a second case in which a part of the second terminal piece is embedded and in which the movable piece is accommodated, wherein the first case and the second case are fixed.

4. The breaker as set forth in claim 1, wherein a center of the welded portion is displaced from a center of the protrusion toward the movable contact.

5. The breaker as set forth in claim 1, wherein the movable piece has a bent portion bent so that the movable contact approaches the fixed contact.

6. The breaker as set forth in claim 1, wherein an edge of the thermally-actuated element overlaps with the contact portion when viewed from a thickness direction of the movable piece.

7. A safety circuit for an electric device, comprising the breaker according to claim 1.

8. A secondary battery pack comprising the breaker as set forth in claim 1.

\* \* \* \* \*